US012590651B2

(12) United States Patent
Wiesmann et al.

(10) Patent No.: US 12,590,651 B2
(45) Date of Patent: Mar. 31, 2026

(54) SEALING ELEMENT FOR SEALING FLUID LINES IN A FEED-THROUGH OPENING OF A WALL AND SEALING ARRANGEMENT WITH THE SEALING ELEMENT AND METHOD FOR MOUNTING THE SEALING ARRANGEMENT

(71) Applicant: Hanon Systems, Daejeon (KR)

(72) Inventors: Ralph Wiesmann, Euskirchen (DE); Wimar Zimmermann, Frechen (DE); Holger Scheib, Küln (DE); Olaf Bode, Cologne (DE)

(73) Assignee: HANON SYSTEMS, Daejeon (KR)

( * ) Notice: Subject to any disclaimer, the term of this patent is extended or adjusted under 35 U.S.C. 154(b) by 92 days.

(21) Appl. No.: 18/571,793

(22) PCT Filed: Oct. 5, 2022

(86) PCT No.: PCT/KR2022/014956
§ 371 (c)(1),
(2) Date: Dec. 19, 2023

(87) PCT Pub. No.: WO2023/059049
PCT Pub. Date: Apr. 13, 2023

(65) Prior Publication Data
US 2024/0288098 A1 Aug. 29, 2024

(30) Foreign Application Priority Data
Oct. 6, 2021 (DE) ..................... 10 2021 125 944.4

(51) Int. Cl.
*F16L 5/14* (2006.01)
*B60H 1/00* (2006.01)

(52) U.S. Cl.
CPC ............ *F16L 5/14* (2013.01); *B60H 1/00571* (2013.01); *B60H 2001/00635* (2013.01)

(58) Field of Classification Search
CPC .......... F16L 5/14; F16L 5/10; B60H 1/00571; B60H 2001/00635; F25B 41/40; F25B 2500/221
(Continued)

(56) References Cited

U.S. PATENT DOCUMENTS

2011/0127730 A1* 6/2011 Seryi ................... B60R 13/0846
277/606
2015/0021858 A1* 1/2015 Richter .............. B60H 1/00535
277/606
(Continued)

FOREIGN PATENT DOCUMENTS

JP 2002186153 A 6/2002
KR 20190105936 A 9/2019

*Primary Examiner* — Steve S Tanenbaum
(74) *Attorney, Agent, or Firm* — Shumaker, Loop & Kendrick, LLP

(57) ABSTRACT

A sealing element for sealing fluid connection lines in a feed-through opening of a wall, in particular of a vehicle body. The sealing element has a first front wall with at least two first insertion openings for receiving first fluid connection lines, and at least two second insertion openings for receiving second fluid connection lines. The second insertion openings are formed in a second front wall. In doing so, the front walls are respectively arranged in a plane formed by y, z directions and connected to one another with a circumferential wall aligned in an axial direction x of the fluid connection lines. The circumferential wall is formed with an expansion function for variably spacing the front walls in the axial direction x.

21 Claims, 8 Drawing Sheets

(58) Field of Classification Search
USPC ........................................................ 165/53
See application file for complete search history.

(56)                       References Cited

U.S. PATENT DOCUMENTS

2017/0009912 A1\*   1/2017  Berger ................... F16J 15/025
2020/0346515 A1\*  11/2020  Hoehn ..................... F16L 5/10

\* cited by examiner

SEALING ELEMENT FOR SEALING FLUID LINES IN A FEED-THROUGH OPENING OF A WALL AND SEALING ARRANGEMENT WITH THE SEALING ELEMENT AND METHOD FOR MOUNTING THE SEALING ARRANGEMENT

CROSS REFERENCE TO RELATED PATENT APPLICATIONS

This is a U.S. national phase patent application of PCT/KR2022/014956 filed Oct. 5, 2022 which claims the benefit of and priority to German Patent Application No. 10 2021 125 944.4 filed on Oct. 6, 2021, the entire contents of each of which are incorporated herein by reference.

TECHNICAL FIELD

The invention relates to a sealing element for sealing a fluid line guided through a feed-through opening formed in a wall, in particular of a vehicle body, specifically of an air conditioning system of a motor vehicle. The sealing element has a first front wall with at least two first insertion openings for receiving first fluid connection lines, and at least two second insertion openings for receiving second fluid connection lines.

The invention also relates to a sealing arrangement with the sealing element and a method for mounting the sealing arrangement.

BACKGROUND ART

Air conditioning systems of motor vehicles known from the state of the art have, apart from at least one refrigerant circuit, also at least one coolant circuit in connection with an air conditioning. The air conditioning which serves to cool and heat the incoming air for the passenger compartment is arranged, together with the most components, such as the housing with air guiding channels and air guiding means, such as flaps and at least one inlet and several outlets, within the passenger compartment surrounded by the vehicle body. In the air guiding channels, on the other hand, components of the refrigerant circuit, such as an evaporator or a condenser/gas cooler for the refrigerant, or a thermal heat exchanger of a coolant circuit are arranged.

Different heat sources and heat sinks are thermally connected to one another with the circuits, e.g. depending on the environmental temperature of the air and the operating mode of the air conditioning system.

As different heat exchangers provided as heat sources and heat sinks, e.g. for transferring heat with the environmental air or components of the drive train of the motor vehicle are arranged outside of the passenger compartment, at least one feed-through opening for feeding connection lines of the refrigerant circuit and connection lines of the coolant circuit through the vehicle body as the wall of the passenger compartment is required. The through-feed opening is to be closed with the through-feed of the connection lines and preferably to be sealed with a sealing element in order to, e.g., prevent the ingress of water on the one hand and noise emission into the passenger compartment on the other hand. The connection lines of the refrigerant circuit and the connection lines of the coolant circuit are preferably guided through a common feed-through opening.

Standard sealing elements abut the interface of the body, in particular of a sheet e.g. formed as a fire wall or bottom, connection lines of the refrigerant circuit, such as the lines connected to the evaporator of the refrigerant, including an expansion element, connection lines of the coolant circuit to the thermal heat exchanger and the housing of the air conditioning. Furthermore, the sealing element can be located at an interface of a bottom cover arranged in the passenger compartment in order to suppress audible or noticeable vibrations, in particular a carpet.

In doing so, the sealing elements are configured to guarantee, apart from the air tightness, the water tightness as well, dampen the transfer of sound and be resistant against high temperatures and, for a certain time, against fire as well. Furthermore, the sealing elements serve to absorb tolerance of the components to be sealed, such as between the connection lines guided through the through-feed opening and the border of the feed-through opening. The sealing elements must be resistant against gasoline, oil and other liquids or chemicals and easy to compress.

A refrigerant heat exchanger unit is pre-mounted with a refrigerant heat exchanger preferably operated as an evaporator and an expansion element upstream of the refrigerant heat exchanger in the flow direction of the refrigerant as components of the refrigerant circuit. The refrigerant heat exchanger and the expansion element are connected to one another via the connection lines of the refrigerant circuit. The sealing element arranged in the region of the connection lines and the expansion element are pre-mounted on the refrigerant heat exchanger unit in order to perform a leak test, in particular with helium, directly on the refrigerant heat exchanger unit. Due to the arrangement and the mounting of the individual components with the mounting device required thereto and the available space, there is a mounting conflict.

The available installation space and the prescribed boundary conditions require, with regard to the sealing arrangements for sealing the connection lines of the refrigerant circuit and the connection lines of the coolant circuit within the feed-through opening known from the state of the art, additional special constructive solutions which, again, require additional components or special arrangements of the additional components as well and thus cause additional production and mounting costs.

SUMMARY

The object of the invention is the provision of a sealing element of a sealing arrangement for sealing connection lines of the refrigerant circuit and connection lines of the coolant circuit within a feed-through opening formed in a wall, in particular of the passenger compartment, for minimum installation space, which fulfils the given boundary conditions, for example concerning leaks and leak test, sealing requirements and noise reduction. The sealing arrangement should be easy to produce and mount with a minimum number of sealing elements in order to minimize the mounting effort and the production costs.

The object is achieved by the subject matters with the features as shown and described herein.

The object is achieved by a sealing element according to the invention for sealing fluid connection lines in a feed-through opening of a wall, in particular a vehicle body. The sealing element has a first front wall with at least two first insertion openings for receiving first fluid connection lines. The sealing element is further formed with at least two second insertion openings for receiving second fluid connection lines.

According to the concept of the invention, the second insertion openings are provided in a second front wall. In doing so, the first front wall and the second front wall are respectively arranged in a plane formed by y, z directions and connected to one another with a circumferential wall aligned in an axial direction x of the fluid connection lines. The circumferential wall is formed with an expansion function for variably spacing the front walls in the axial direction x of the fluid connection lines. The x, y, z directions are respectively aligned orthogonally to one another.

According to a further development of the invention, the circumferential wall is formed closed around the whole circumference and has an expansion wall element. The circumferential wall is advantageously substantially formed as a hollow cylinder. In doing so, the base surfaces of the circumferential wall or of individual components of the circumferential wall are preferably formed in a taping manner along the longitudinal axis in the x direction.

According to a first alternative embodiment of the invention, the circumferential wall has at least one section being connected to the expansion wall element on a first frontally formed edge in the x direction, and being connected to one of the front walls around the whole circumference on a second frontally formed edge distally to the first frontally formed edge.

The expansion wall element is preferably connected around the whole circumference to the at least one section of the circumferential wall on a first frontally formed edge in the x direction, and to one of the front walls or to a section of the circumferential wall being different from the section connected to the first frontally formed edge on a second frontally formed edge distally to the first frontally formed edge.

Consequently, the expansion wall element can be arranged between a first section and a second section of the circumferential wall. In doing so, the expansion wall element, in an extended condition of the sealing element in the x direction and in an unextended condition of the sealing element in the plane spanned by the y and z directions, respectively is between the first section and the second section of the circumferential wall. In the unextended condition of the sealing element, the first section and the second section of the circumferential wall are arranged inserted into one another.

In doing so, the first section is formed with smaller outer dimensions than the second section, such that the shapes of the sections in the unextended condition of the sealing element, in particular the ones of the outer side of the first section and the ones of the inner side of the second section of the circumferential wall, correspond to one another. Furthermore, in doing so, the outside of the expansion wall element corresponds with the outside of the first section and the inside of the expansion wall element with the inside of the second section with the circumferential wall.

According to a second alternative embodiment of the invention, the expansion wall element is connected to the first front wall on a first frontally formed edge in the x direction and to the second front wall on a second frontally formed edge distally to the first frontally formed edge. The expansion wall element has, in the unextended condition of the sealing element, preferably respectively at least one reversal of direction of the wall in the range from 90° to 180°. In doing so, the expansion wall element, in the unextended condition of the sealing element, can have the reversal of direction of the wall on at least one front side and/or in the region between the front sides. In doing so, the expansion wall element can, e.g. also have two reversals of direction of respectively about 90° or respectively about 180° or two reversals of direction of about 90° and about 180° or also more than two reversals of direction with different reversal angles.

According to an advantageous embodiment of the invention, the at least one section of the circumferential wall or the expansion wall element is connected to the first front wall at a respective frontally formed edge. In doing so, the frontally formed edge of the at least one section of the circumferential wall or of the expansion wall element surrounds the first front wall at an outer circumference around the whole circumference.

The first insertion openings for receiving the first fluid connection lines are preferably formed respectively surrounded by a first sealing region around the whole circumference. In doing so, the first sealing region can have the shape of an angled annular disk which is connected around the whole circumference to a perimeter of a first insertion opening at an inner radius and to the first front wall at an outer radius.

According to a further preferred embodiment of the invention, the at least one section of the circumferential wall or the expansion wall element is connected to the second front wall at a respective frontally formed edge. In doing so, the frontally formed edge of the at least one section of the circumferential wall or of the expansion wall element surrounds an opening formed in the second front wall at an outer circumference of the opening around the whole circumference.

The second insertion openings for receiving the second fluid connection lines are preferably formed respectively surrounded by a second sealing region around the whole circumference. In doing so, the second sealing region can have the shape of an angled annular disk which is connected around the whole circumference to a perimeter of a second insertion opening at an inner radius and to the second front wall at an outer radius.

A further advantage of the invention is that the second front wall is connected to a second circumferential wall, which is aligned in the x direction, at the outer edge aligned distally to an inner edge formed as connection to the at least one section of the first circumferential wall or of the expansion wall element. The frontally formed edge of the second circumferential wall, in particular shaped as a hollow cylinder, surrounds the second front wall at an outer circumference preferably around the whole circumference.

The second circumferential wall, at the edge aligned distally to the frontally formed edge as connection to the second front wall, preferably has a third sealing region surrounding the edge around the whole circumference. The third sealing region of the sealing element can substantially be arranged in a plane spanned by the y and z directions and formed to point outwards from the frontally formed edge of the second circumferential wall, in particular protrude from the circumferential wall.

According to a further development of the invention, the first fluid connection lines are formed as refrigerant connection lines of a refrigerant circuit and the second fluid connection lines are formed as coolant connection lines of a coolant circuit, in particular of an air-conditioning system.

The object of the invention is also achieved by a sealing arrangement according to the invention with a refrigerant heat exchanger unit with a refrigerant heat exchanger and coolant connection lines, a coolant heat exchanger unit with a coolant heat exchanger and coolant connection lines and the sealing element according to the concept for sealing the refrigerant connection lines and the coolant connection lines in a feed-through opening of a wall, in particular a vehicle body.

Furthermore, the object of the invention is achieved by a method for mounting the sealing arrangement according to the invention. The method has the following steps:

pre-mounting the sealing element on the refrigerant connection lines of the refrigerant heat exchanger unit, the refrigerant connecting lines being inserted through the first insertion openings of the sealing element and the sealing element sealingly abutting the refrigerant connection lines, arranging the refrigerant heat exchanger unit with the pre-mounted sealing element in the extended state in a housing of an air conditioning, arranging the coolant heat exchanger unit by pushing the coolant heat exchanger into the housing of the air conditioning, wherein the coolant connection lines are arranged with a coolant circuit interface in the region of the second insertion openings of the sealing element, mounting a sealing element housing on the housing of the air conditioning, and bringing the sealing element into the unextended state by folding in the sealing element, wherein the coolant connection lines with the coolant circuit interface are inserted through the second insertion openings of the sealing element.

The coolant connection lines of the coolant heat exchanger unit advantageously have a length which offers enough space for an inexpensive clamp connection in the region of the coolant circuit interface.

The sealing element according to the invention with an integrated bellows and the sealing arrangement according to the invention, in particular with the sealing element, in summary have further various advantages:

the sealing element which is integrally formed as an integrated bellows and thus inexpensive, enables the required mounting order of the components of the sealing arrangement which fulfils the requested boundary conditions, such as concerning leaks and leak tests, sealing requirements and noise reduction, the sealing arrangement guarantees a minimum sound passage through the wall into the passenger compartment and requires a minimum of mounting time with a minimum installation space.

BRIEF DESCRIPTION OF DRAWINGS

Further details, features and advantages of the invention will become apparent from the following description of example embodiments with reference to the accompanying drawings. The following is shown:

FIGS. 7A and 7B: the sealing element in the extended condition and in the unextended condition respectively in connection with the refrigerant connection lines with expansion element and the coolant connection lines in a perspective view.

DESCRIPTION OF AN EMBODIMENT

Figure 1:
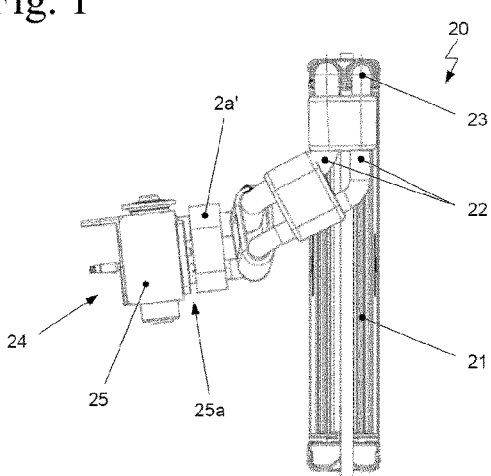
FIG. 1: a refrigerant heat exchanger unit with a refrigerant heat exchanger and a thermostatic expansion valve components of a refrigerant circuit connected to one another via refrigerant connection lines with a sealing element for sealing the connection lines in a lateral representation.

FIG. 1 shows a refrigerant heat exchanger unit 20 with a refrigerant heat exchanger 21 preferably operated as an evaporator and an expansion element 25 upstream of the refrigerant heat exchanger 21 in the flow direction of the refrigerant, in particular a thermostatic expansion valve, in a lateral representation. The thermostatic expansion valve can be formed as a standard valve or with a shut-off function. The refrigerant heat exchanger 21 and the expansion element 25 are components of a refrigerant circuit which are connected to one another via refrigerant connection lines 22. The refrigerant heat exchanger unit 20 further has a sealing element 2a. for sealing the refrigerant connection lines 22 against a wall, in particular of the vehicle body as a delimitation of the passenger compartment.

The expansion element 25, which is, on the one hand, formed as the refrigerant circuit interface 24 of the refrigerant heat exchanger unit 20 is, on the other hand, mechanically connected to first ends of the refrigerant connection lines 22 via a port 25a. The refrigerant connection lines 22 are soldered to second ends formed distally to the first ends at a transition 23 with the refrigerant heat exchanger 21, as in particular during the use of flammable refrigerants, such as R1234yf, a mechanically releasable connection of the refrigerant connection lines 22 in the passenger compartment is not allowed. Possible refrigerant leaks must not get into the passenger compartment. The expansion element 25 is arranged outside of the passenger compartment and thus at an outside of the wall delimiting the passenger compartment.

Due to provisions concerning refrigerant leaks into the environment, gas tightness of the mechanical connections of the refrigerant connection lines 22 generally is of great importance. The provisions also require, e.g. a helium leak test of the connections between the refrigerant connection lines 22 and the expansion element 25. Such leak test of the refrigerant heat exchanger unit 20 is preferably performed on a subordinate mounting level.

The refrigerant heat exchanger unit 20 is sealed against the wall of the vehicle body by means of the sealing element 2a.' in the region of the refrigerant connection lines 22 as the expansion element 25 has a gap-shaped contour which makes sealing against the wall very difficult.

The expansion element 25 and the sealing element 2a.' are pre-mounted at the refrigerant heat exchanger unit 20 in order to be able to perform the helium leak test directly on the refrigerant heat exchanger unit 20 and thus guarantee the requirements for refrigerant leaks.

Figure 2:
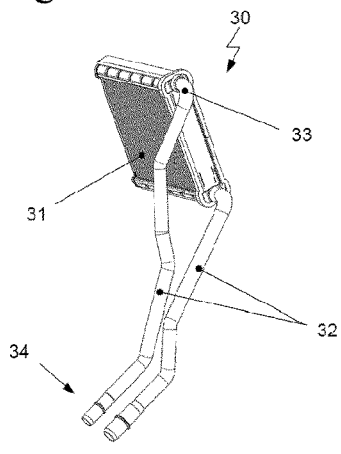
FIG. 2: a coolant heat exchanger unit with a coolant heat exchanger and coolant connection lines in a perspective view.

In FIG. 2, a coolant heat exchanger unit 30 with a coolant heat exchanger 31 preferably operated as a thermal heat exchanger and coolant connection lines 32 as components of a coolant circuit is shown in a perspective view.

The first ends of the coolant connection lines 32 are formed as a first coolant circuit interface 34. The coolant connection lines 32 are soldered to second ends formed distally to the first ends at a transition 33 with the coolant heat exchanger 31.

The coolant heat exchanger 31 is arranged within the air conditioning and thus within the passenger compartment. The coolant connection lines 32 respectively represent a connection to the components of the coolant circuit provided in the environment of the passenger compartment.

The coolant heat exchanger unit 30 has a non-represented sealing element for sealing the coolant connection lines 32 against the wall, in particular of the vehicle body as a delimitation of the passenger compartment, within a feed-through opening through the wall.

Figure 3A:
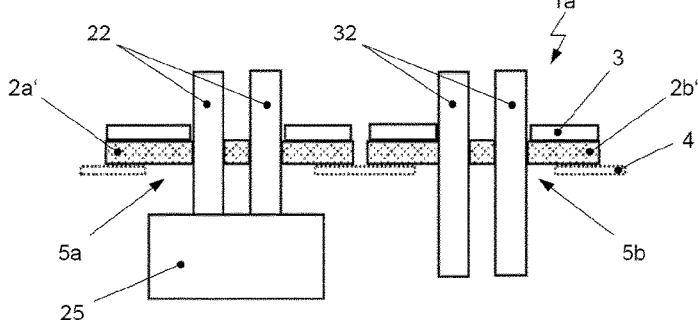
FIG. 3A: a sealing arrangement of the state of the art with separated feed-through openings within a wall for separate feed-through of refrigerant connection lines and coolant connection lines and two different sealing elements in a lateral representation.

FIG. 3A shows a sealing arrangement 1a' of the state of the art with separated feed-through openings 5a, 5b within the wall 4 for separate feed-through of the refrigerant connection lines 22 and the coolant connection lines 32 and two different sealing elements 2a.', 2b' in a lateral representation, while FIGS. 3B to 3E respectively show a sealing arrangement 1b', 1c', 1d', 1e' of the state of the art with a common feed-through opening 5 within the wall 4 for common feed-through of the refrigerant connection lines 22 and coolant connection lines 32 and two different sealing elements 2a.', 2b' or one sealing element 2a.' with a joint 6 in a lateral representation. With every sealing arrangement 1a', 1b', 1c', 1d', 1e', an expansion element 25 is arranged outside of the passenger compartment and thus at the outside of the wall 4 delimiting the passenger compartment.

The sealing arrangement 1a' of FIG. 3A has separated feed-through openings 5a, 5b within the wall 4 for the feed-through of the refrigerant connection lines 22 and the coolant connection lines 32. In doing so, a first sealing element 2a.' for sealing the refrigerant connection lines 22 and a second sealing element 2b' for sealing the coolant connection lines 32 are provided. The flat or disc-shaped sealing elements 2a.', 2b' are respectively arranged between a housing 3 of the air condition and the wall 4. The refrigerant connection lines 22 and the coolant connection lines 32 are inserted through insertion openings formed in the sealing elements 2a.', 2b''.

The first sealing element 2a.' for sealing the refrigerant connection lines 22 is pre-mounted on the refrigerant connection lines 22 of the refrigerant heat exchanger unit 20. The order of mounting the individual components is uncritical.

Figure 3B:
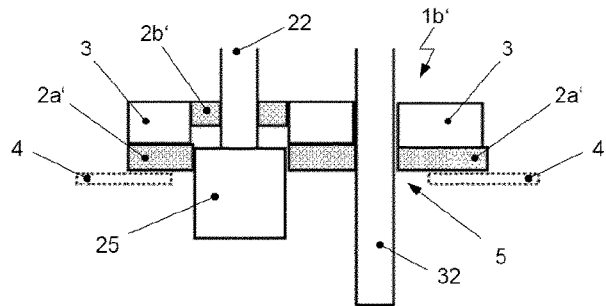
FIGS. 3B to 3E: respectively one sealing arrangement of the state of the art with a common feed-through opening within the wall for common feed-through of the refrigerant connection lines and the coolant connection lines and two different sealing elements or one sealing element with a joint in a lateral representation.
Figure 3C:
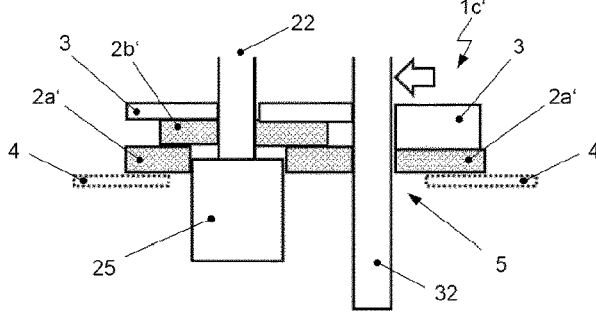

The sealing arrangement 1b' of FIG. 3B and the sealing arrangement 1c' of FIG. 3C respectively have one common feed-through opening 5 within the wall 4 for the feed-through of the refrigerant connection lines 22 and the coolant connection lines 32. In doing so, a respective first sealing element 2a.' is provided for sealing the refrigerant connection lines 22 and of the expansion element 25 and the coolant connection lines 32, while a second sealing element 2b' is provided for sealing the refrigerant connection lines 22. The flat or disc-shaped first sealing element 2a.' is respectively arranged between the housing 3 of the air condition, the wall 4 and the expansion element 25. The second sealing element 2b' of the sealing arrangement 1b' of FIG. 3B is arranged within a feed-through opening formed in the housing 3 of the air conditioning and the refrigerant connection lines 22. In comparison, the second sealing element 2b' of the sealing arrangement 1c' of FIG. 3C seals between the housing 3 of the air conditioning and the first sealing element 2a.

The refrigerant connection lines 22 are respectively inserted through insertion openings formed in the first sealing element 2a.', while the coolant connection lines 32 are respectively inserted through insertion openings formed in the second sealing element 2b.

The sealing arrangement 1b' of FIG. 3B allows the mounting of the coolant heat exchanger 31 and the coolant connection lines 32 in the direction running parallel to the sealing direction.

The second sealing element 2b' of the sealing arrangement 1e of FIG. 3C having a two-part sandwich sealing is pre-mounted at the refrigerant connection lines 22 of the refrigerant heat exchanger unit 20. The sealing arrangement 1e enables the mounting of the coolant heat exchanger unit 30 in the direction running parallel to the sealing direction.

The mounting of the components of the sealing arrangement 1b', 1e respectively is before their arrangement within the feed-through opening 5.

Figure 3D:
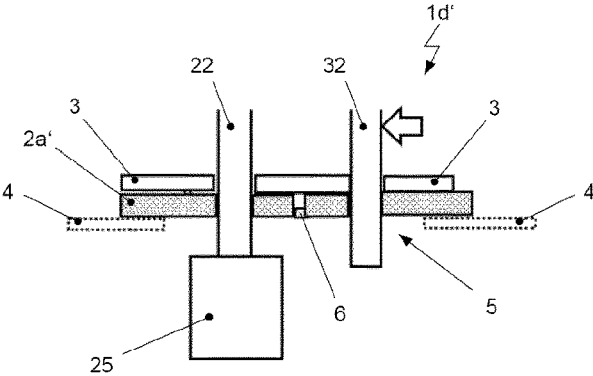
Figure 3E:
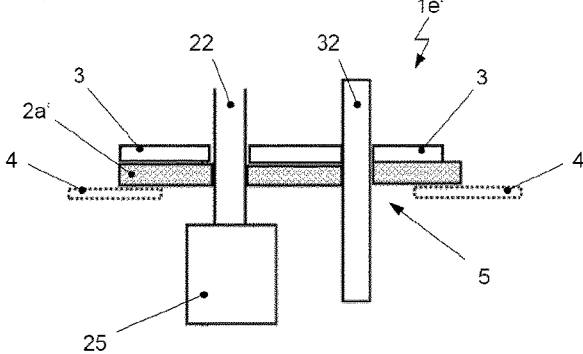

The sealing arrangement 1d' of FIG. 3D and the sealing arrangement 1e' of FIG. 3E also respectively have one common feed-through opening 5 within the wall 4 for the feed-through of the refrigerant connection lines 22 and the coolant connection lines 32. In doing so, respectively one sealing element 2a.' is provided for sealing both the refrigerant connection lines 22 and the coolant connection lines 32. The flat or disc-shaped sealing element 2a.' is respectively arranged between the housing 3 of the air conditioning and the wall 4.

The sealing element 2*a*.' of the sealing arrangement 1*d'* of FIG. 3 formed as a hinge sealing with a joint 6 is pre-mounted at the refrigerant connection lines 22 of the refrigerant heat exchanger unit 20. The foldable embodiment, which allows bending of the sealing element 2*a*.' of up to 90°, enables, in connection with shortly formed coolant connection lines 32 to pull the sealing element 2*a*.' over the coolant connection lines 32. However, the formation of the short coolant connection lines 32 requires a special continuing port at the coolant circuit.

The sealing arrangement 1*d'* also enables the mounting of the coolant heat exchanger unit 30 in the direction running parallel to the sealing direction, while the sealing element 2*a*.' to the feed-through opening 5 is angled at 90°.

With the sealing arrangement 1*e'* of FIG. 3E, in particular the coolant connection lines 32 are mounted in the direction perpendicular to the sealing surface or to the direction of the sealing. The coolant heat exchanger 31 is formed with an additional tube split such that the adjacent coolant connection lines 32 can be mounted separately. Alternatively, the coolant connection lines 32 could also be mounted in the direction of the sealing surface or the direction of sealing.

Due to the boundary conditions, the mounting order and the installation direction and the arrangement of the individual components of the sealing arrangements 1*a'*, 1*b'*, 1*c'*, 1*d'*, 1*e'* of the state of the art in connection with the available installation space, a special design of a sealing arrangement is required.

Figure 4A:
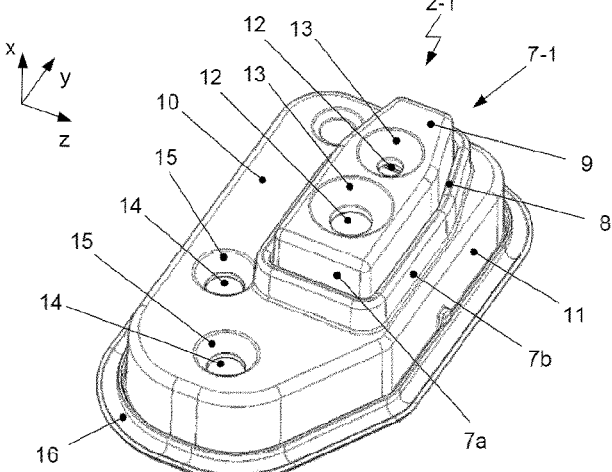
FIGS. 4A and 4B: a first embodiment of a sealing element according to the invention with an expansion function in the axial direction of the connection lines to be sealed of a sealing arrangement with a common feed-through opening within the wall for common feed-through of the refrigerant connection lines and the coolant connection lines in an unextended condition and in an extended condition respectively in a perspective view.
Figure 4B:
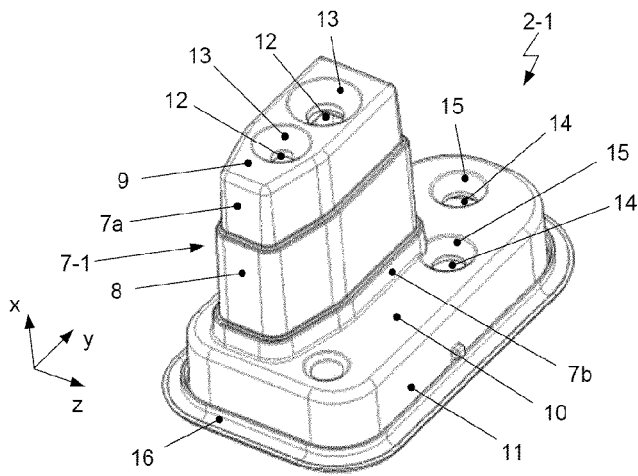
Figure 4C:
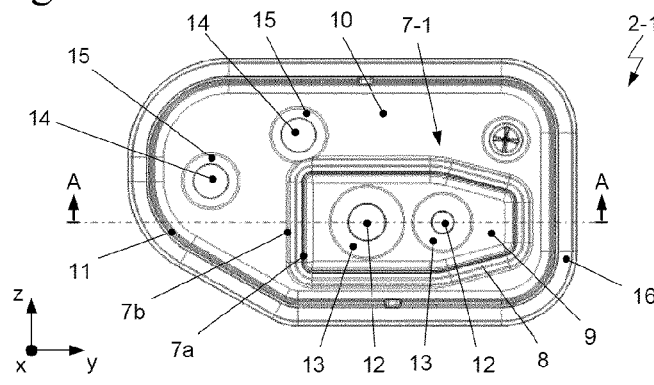
FIG. 4C: the sealing element in the unextended condition according to FIG. 4A in a plan view.
Figure 4D:
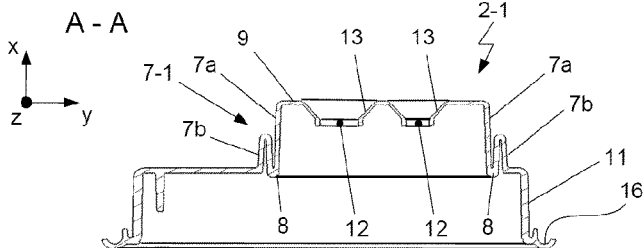
FIGS. 4D and 4E: the sealing element in the unextended condition and in the extended condition of FIGS. 4A and 4B respectively in lateral sectional view.
Figure 4E:
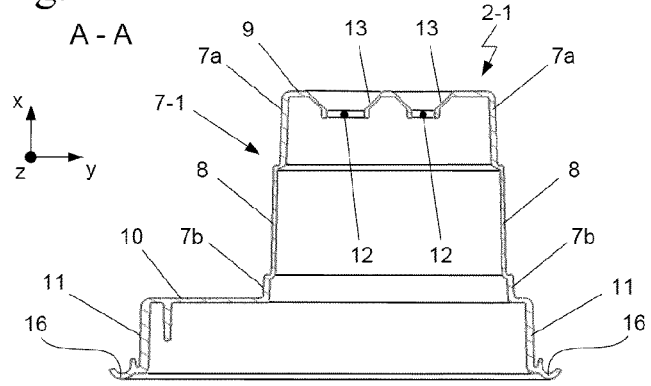

In FIGS. 4A and 4B, a first embodiment of a sealing element 2-1 according to the invention with an expansion function in the axial direction x of the non-represented fluid connection lines to be sealed of a sealing arrangement with a common feed-through opening 5, not represented either, within the wall 4 for the common feed-through of the refrigerant connection lines 22 and the coolant connection lines 32 in an unextended condition and in an extended condition is shown respectively in a perspective view. FIG. 4C shows the sealing element 2-1 in the unextended condition according to FIG. 4A in a plan view, while the sealing element 2-1 of FIGS. 4A and 4B in FIGS. 4D and 4E is shown in the unextended condition and in the extended condition respectively in a lateral sectional view.

The sealing element 2-1 has a first circumferential wall 7-1 which is aligned in the axial direction x of the non-represented refrigerant connection lines 22. The first circumferential wall 7-1, which is closed around the whole circumference and expandable or extendable in the x direction, is formed of a first section 7*a* and a second section 7*b* which are connected to one another via an expansion wall element 8. The expansion wall element 8, in the extended condition of the sealing element 2-1, is arranged in the x direction between the first section 7*a* and the second section 7*b* of the first circumferential wall 7-1. In doing so, the expansion wall element 8 is connected around the whole circumference to the first section 7*a* at a first frontally formed edge in the x direction and to the second section 7*b* of the first circumferential wall 7-1 at a second frontally formed edge.

The first section 7*a* of the first circumferential wall 7-1 is connected to a first front wall 9 of the sealing element 2-1 at the distally aligned edge as a connection to the expansion wall element 8 frontally formed edge. The frontally formed edge of the first section 7*a* of the first circumferential wall 7-1 surrounds the first front wall 9 at an outer circumference.

The first front wall 9 is arranged in a plane spanned by the y and z directions and formed with two first insertion openings 12 for receiving the non-represented refrigerant connection lines 22. The first insertion openings 12 are surrounded by a first sealing region 13 around the whole circumference. The first sealing region 13 having the shape of an angled annular disk is respectively connected around the whole circumference to a perimeter of a first insertion opening 12 at an inner radius and to the first front wall 9 at an outer radius. The first sealing region 13 is aligned into the interior of the volume enclosed by the sealing element 2-1 in the x direction, such that the first front wall 9 delimits the sealing element 2-1 in the x direction.

The second section 7*b* of the first circumferential wall 7-1 is connected to a second front wall 10 of the sealing element 2-1 at the distally aligned edge as a connection to the expansion wall element 8 frontally formed edge. The frontally formed edge of the second section 7*b* of the first circumferential wall 7-1 surrounds an opening formed in the second front wall 10 at an outer circumference of the opening.

The second front wall 10, just as the first front wall 9, is arranged in a plane spanned by the y and z directions and formed with two second insertion openings 14 for receiving the non-represented coolant connection lines 32. The second insertion openings 14 are surrounded by a second sealing region 15 around the whole circumference. The second sealing region 15 having the shape of an angled annular disk, just as the first sealing region, is respectively connected around the whole circumference to a perimeter of a second insertion opening 14 at an inner radius and to the second front wall 10 at an outer radius. The second sealing region 15 is aligned into the interior of the volume enclosed by the sealing element 2-1 in the x direction.

The front walls 9, 10 of the sealing element 2-1 which are connected to one another via the first circumferential wall 7-1 with the expansion wall element 8, form, in particular according to FIG. 4C, a closed surface in connection with the first circumferential wall 71 with the expansion wall element 8 from the view of the planes spanned by the y and z directions.

The second front wall 10 is connected to a second circumferential wall 11 of the sealing element 2-1 at the distally aligned outer edge as a connection to the second section 7*b* of the first circumferential wall 7-1 formed inner formed edge. The second circumferential wall 11 is, just as the first circumferential wall 7-1, aligned in the axial direction x of the non-represented connection lines. The frontally formed edge of the second circumferential wall 11 surrounds the second front wall 10 at an outer circumference around the whole circumference.

The second circumferential wall 11, at the edge aligned distally to the frontally formed edge as connection to the second front wall 10, has a third sealing region 16 surrounding the edge around the whole circumference. The third sealing region 16 of the sealing element 2-1 just as the first front wall 9 and the second front wall 10, is substantially arranged in a plane spanned by the y and z directions and formed to point outwards from the frontally formed edge of the second circumferential wall 11.

The third sealing region 16 of the sealing element 2-1 is within the sealing arrangement between the non-represented housing 3 of the air conditioning and the non-represented wall 4 of the passenger compartment.

The first circumferential wall 7-1 has, with the expansion wall element 8 formed between the first section 7*a* and the second section 7*b*, the shape of a bellows which enables an elastic expansion of the sealing element 2-1 in the x direction. With the formation of the bellows, in particular the first front wall 9 with the first insertion openings 12 and the respective first sealing region 13 can be unfolded in the sealing direction for sealing the refrigerant connection line 22.

In the unextended condition according to FIGS. 4A and 4D, the expansion wall element 8 is arranged in the plane spanned by the y and z directions between the first section 7*a* and the second section 7*b* of the first circumferential wall 7-1 in a folded manner. At the front sides, the expansion wall element 8 respectively has a reversal of direction of the wall of up to 180°. The first section 7*a* and the second section 7*b* of the first circumferential wall 7-1 are arranged inserted into one another. Consequently, the first section 7*a* has smaller outer dimensions than the second section 7*b* of the first circumferential wall 7-1. The outer shapes of the sections 7*a*, 7*b* of the first circumferential wall 7-1 correspond to one another.

In the extended condition according to FIGS. 4B and 4E, the expansion wall element 8 is arranged in the x direction between the first section 7*a* and the second section 7*b* of the first circumferential wall 7-1 in an unfolded manner or extended at full length. At the front sides of the expansion wall element 8, a respective transition to the sections 7*a*, 7*b* of the first circumferential wall 7-1 is formed.

With the sealing element 2-1 with the formation of the first circumferential wall 7-1 as an integrated bellows and the first front wall 9 with the first sealing regions 13 for sealing the refrigerant connection line 22, the required boundary conditions, e.g. concerning a leak test and thus a mounting order of the individual components of a sealing arrangement are fulfilled.

Figure 5A:
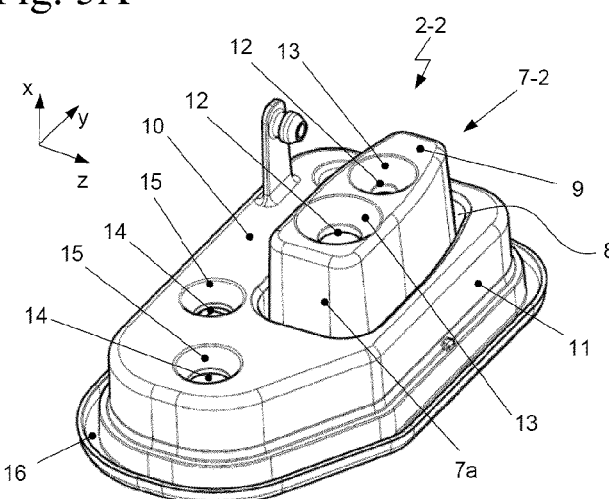
FIGS. 5A and 5B: a second embodiment of a sealing element according to the invention with an expansion function in the axial direction of the connection lines to be sealed of a sealing arrangement with a common feed-through opening within the wall for common feed-through of the refrigerant connection lines and the coolant connection lines in an unextended condition and in an extended condition respectively in a perspective view.
Figure 5B:
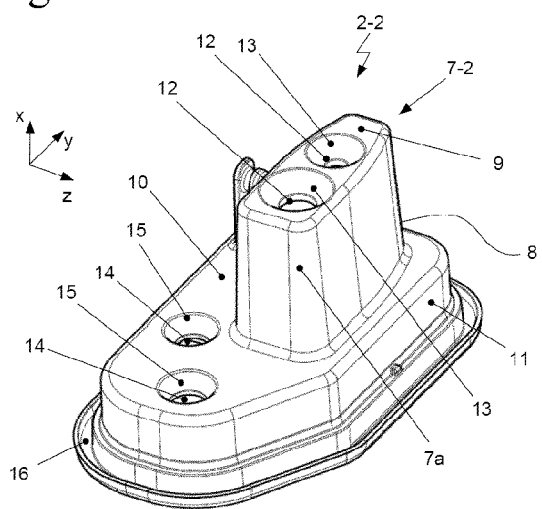
Figure 5C:
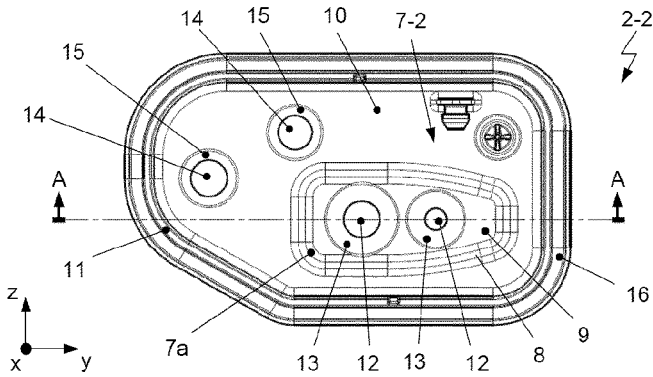
FIG. 5C: the sealing element in the unextended condition according to FIG. 5A in a plan view.
Figure 5D:
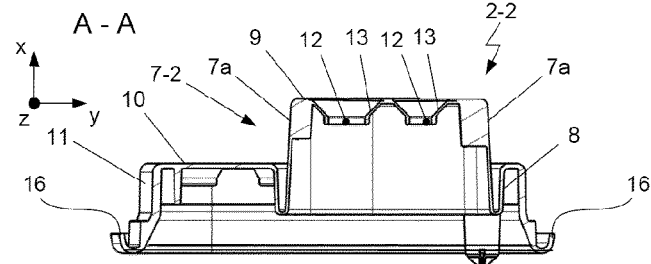
FIGS. 5D and 5E: the sealing element in the unextended condition and in the extended condition of FIGS. 5A and 5B respectively in lateral sectional view.
Figure 5E:
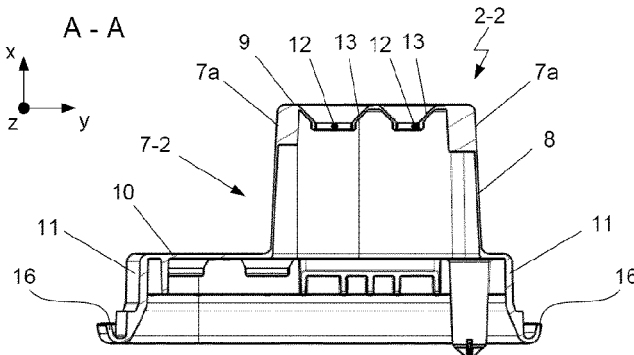

In FIGS. 5A and 5B, a second embodiment of a sealing element 2-2 according to the invention with an expansion function in the axial direction x of the non-represented fluid connection lines to be sealed of a sealing arrangement with a common feed-through opening 5, not represented either, within the wall 4 for the common feed-through of the refrigerant connection lines 22 and the coolant connection lines 32 in an unextended condition and in an extended condition is shown respectively in a perspective view. FIG. 5C shows the sealing element 2-2 in the unextended condition according to FIG. 5A in a plan view, while the sealing element 2-2 of FIGS. 5A and 5B in FIGS. 5D and 5E is shown in the unextended condition and in the extended condition respectively in a lateral sectional view.

The sealing element 2-2 has a first circumferential wall 7-2 which is aligned in the axial direction x of the non-represented refrigerant connection lines 22. The major difference between the first embodiment of the sealing element 2-1 of FIGS. 4A to 4E and the second embodiment of the sealing element 2-2 of FIGS. 5A to 5E is the formation of the first circumferential wall 7-1, 7-2. In doing so, the first circumferential wall 7-2 of the second sealing element 2-2 is formed without the second section 7*b*.

In doing so, the first circumferential wall 7-2, which is closed around the whole circumference and expandable or extendable in the x direction, is formed from the section 7*a* and the expansion wall element 8. The expansion wall element 8, in the extended condition of the sealing element 2-2 is arranged in the direction x between the section 7*a* and the second front wall 10. The expansion wall element 8 is connected around the whole circumference to the section 7*a* at the first frontally formed edge in the x direction and to the second front wall 10 of the sealing element 2-2 at the second frontally formed edge. The frontally formed edge of the expansion wall element 8 surrounds the opening formed in the second front wall 10 at an outer circumference of the opening.

The first circumferential wall 7-2, with the section 7*a* and the expansion wall element 8, also has the shape of a bellows which enables an elastic expansion of the sealing element 2-2 in the x direction. With the formation of the bellows, on the other hand, in particular the first front wall 9 with the first insertion openings 12 and the respective first sealing region 13 can be unfolded in the sealing direction for sealing the refrigerant connection line 22.

In the unextended condition according to FIGS. 5A and 5D, the expansion wall element 8 is arranged in the plane spanned by the y and z directions between the section 7*a* of the first circumferential wall 7-2 and the second front wall 10 of the sealing element 2-2 in a folded manner. Between the front sides, the expansion wall element 8 has a reversal of direction of the wall of up to 180°. Consequently, the section 7*a* is formed with smaller outer dimensions than the opening within the second front wall 10. The outer circumference of the opening formed in the second front wall 10 and the outer shape of the section 7*a* of the first circumferential wall 7-2 correspond with each other.

In the extended condition according to FIGS. 5B and 5E, the expansion wall element 8 is arranged unfolded or fully extended in the x direction between the section 7*a* of the first circumferential wall 7-2 and the second front wall 10.

Figure 6A:
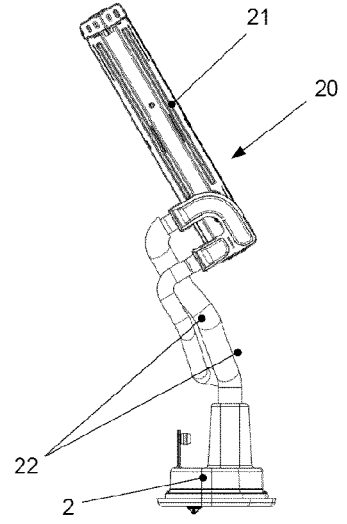
FIGS. 6A and 6B: the refrigerant heat exchanger unit with pre-mounted sealing element in a lateral representation and within the housing of the air conditioning in a perspective view.
Figure 6B:
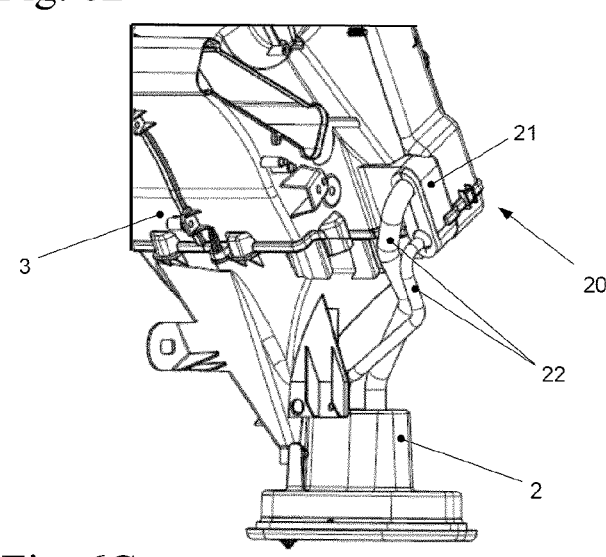

FIGS. 6A and 6B show the refrigerant heat exchanger unit 20 with the refrigerant heat exchanger 21 and the refrigerant connection lines 22 and the sealing element 2 pre-mounted at the refrigerant connection lines 22 in a lateral representation and within the housing 3 of the air conditioning in a perspective view. The second embodiment of the sealing element 2-2 of FIGS. 5A to 5E is represented as the sealing element 2 representative of all possible sealing elements.

The sealing element 2 sealingly abutting the refrigerant connection lines 22 is pre-mounted at the refrigerant heat exchanger unit 20 in order to enable the helium leak test before the mounting of the refrigerant heat exchanger unit 20 within the sealing arrangement 1. With the helium leak test, the tightness of the connections within the refrigerant heat exchanger unit 20, in particular the mechanical connection to the non-represented expansion element 25, is tested.

Figure 6C:
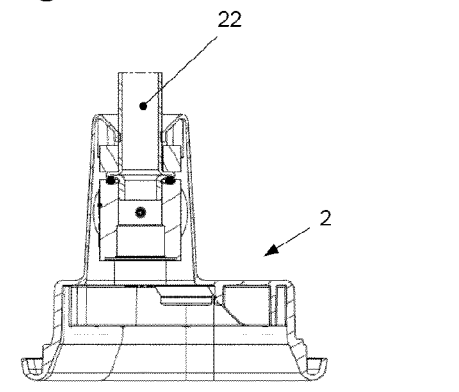
FIG. 6C: the sealing element in the pre-mounted condition at the refrigerant connection lines of the refrigerant heat exchanger unit in a lateral sectional view.

In FIG. 6C, the sealing element 2 in the pre-mounted condition at the refrigerant connection lines 22 of the refrigerant heat exchanger unit 20 is shown in a lateral sectional view. The refrigerant connection lines 22 are inserted through the first insertion openings 12 of the sealing element 2.

The refrigerant heat exchanger unit 20 is inserted into the housing 3 of the air conditioning with the pre-mounted sealing element 2 in the extended condition.

Figure 6D:
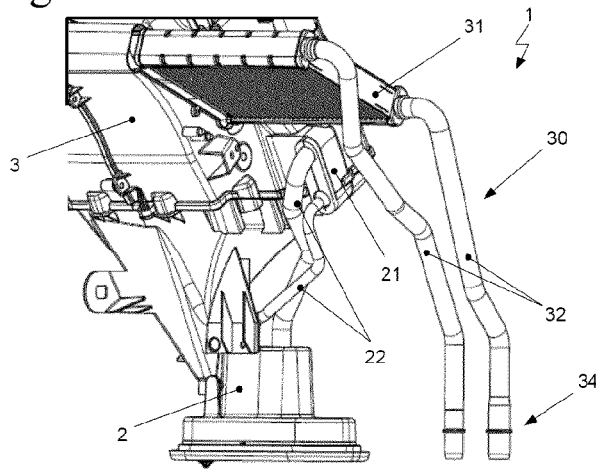
FIGS. 6D and 6E: the sealing arrangement with the refrigerant heat exchanger unit pre-mounted with the sealing element within the housing of the air conditioning and the coolant heat exchanger unit outside and inside the housing of the air conditioning respectively in a perspective view.
Figure 6E:
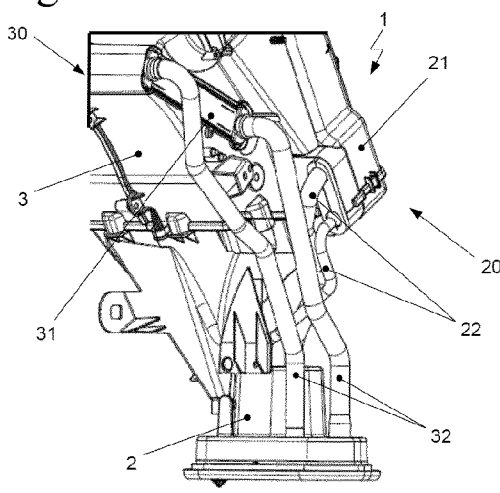

Subsequently, the coolant heat exchanger unit 30 is inserted into the housing 3 of the air conditioning. FIGS. 6D and 6E show the sealing arrangement 1 with the refrigerant heat exchanger unit 20 pre-mounted with the sealing element 2 within the housing 3 of the air conditioning and the coolant heat exchanger unit 30 outside and inside the housing 3 of the air conditioning respectively in a perspective view.

The coolant heat exchanger unit 30 with the coolant heat exchanger 31 and the coolant connection lines 32 is arranged within the housing 3 of the air conditioning in the required installation position. In doing so, the coolant connection lines 32 with the coolant circuit interface 34 are arranged in the region of the non-represented second insertion openings 14 of the sealing element 2. The expansion wall element 8 of the first circumferential wall 7-1, 7-2 enables the extension of the sealing element 2, such that the installation space for the coolant heat exchanger unit 30 is released.

Figure 6F:
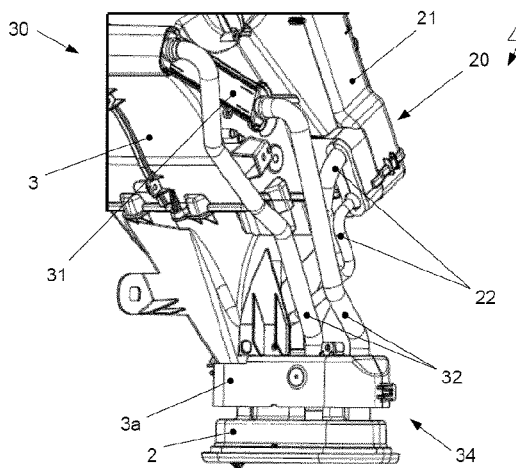
FIG. 6F: the sealing arrangement according to FIG. 6E with a sealing element housing in a perspective view.

Subsequently thereto, a sealing element housing 3a is mounted as a component of the housing 3 of the air conditioning. FIG. 6F shows the sealing arrangement 1 according to FIG. 6E with the sealing element housing 3a in a perspective view.

Figure 6G:
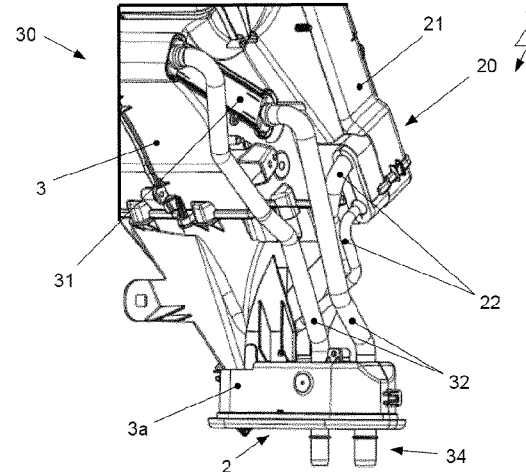
FIG. 6G: the sealing arrangement according to FIG. 6F with the sealing element in the unextended condition in a perspective view.

In the following step of folding or collapsing the sealing element 2 and thus bringing the sealing element 2 into the unextended condition according to FIG. 6G, the coolant connection lines 32 with the coolant circuit interface 34 are inserted through the non-represented second insertion openings 14 of the sealing element 2.

Figures 7A, 7B:
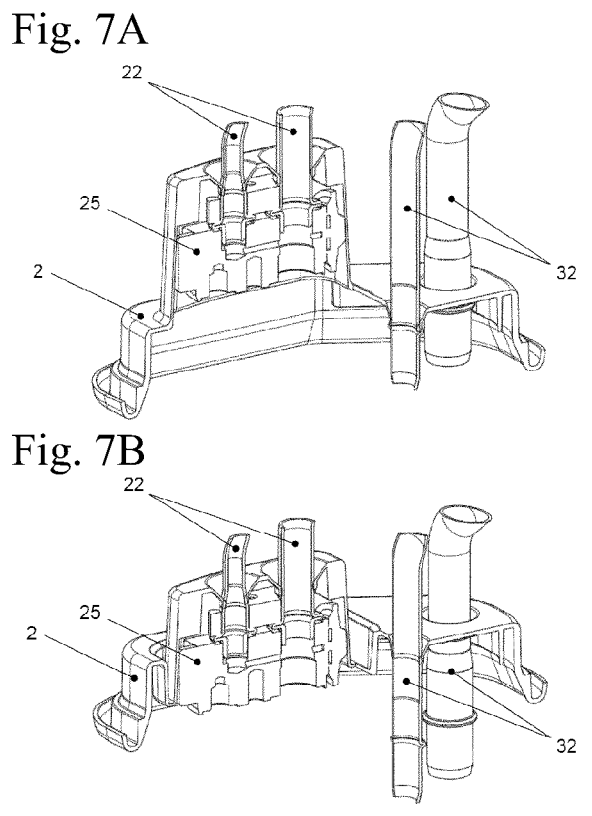

The process of introducing and inserting the coolant connection lines 32 of the coolant heat exchanger unit 30 into and through the second insertion openings 14 of the sealing element 2 is also shown in FIGS. 7A and 7B, which show the sealing element 2 in the extended condition on the one hand and in the unextended condition on the other hand, respectively in connection with the refrigerant connection lines 22 with the expansion element 25 arranged thereon and the coolant connection lines 32 in a perspective view.

The installation direction of the coolant heat exchanger unit 30, in particular of the coolant connection lines 32, runs parallel to the sealing surface.

LIST OF REFERENCE NUMERALS

1, 1a'-1e' sealing arrangement
2, 2-1, 2-2 sealing element
2a.' (first) sealing element
2b' second sealing element
3 housing of air conditioning
3a sealing element housing
4 wall
5 feed-through opening of wall 4
5a first feed-through opening of wall 4
5b second feed-through opening of wall 4
6 joint of sealing element 2a.'
7-1, 7-2 first circumferential wall of sealing element 2-1, 2-2
7a (first) section of first circumferential wall 7-1, 7-2
7b second section of first circumferential wall 7-1
8 expansion wall element of first circumferential wall 7-1, 7-2
9 first front wall of sealing element 2-1, 2-2
10 second front wall of sealing element 2-1, 2-2
11 second circumferential wall of sealing element 2-1, 2-2
12 first insertion opening
13 first sealing region
14 second insertion opening
15 second sealing region
16 third sealing region
20 refrigerant heat exchanger unit
21 refrigerant heat exchanger
22 refrigerant connection lines
23 transition
24 refrigerant circuit interface
25 expansion element
25a port
30 coolant heat exchanger unit
31 coolant heat exchanger
32 coolant connection lines
33 transition
34 coolant circuit interface
x, y, z direction

The invention claimed is:

1. A sealing element for sealing fluid connection lines in a feed-through opening of a wall, the sealing element comprising:
   a first front wall with at least two first insertion openings for receiving first fluid connection lines, and
   at least two second insertion openings for receiving second fluid connection lines, wherein the second insertion openings are formed in a second front wall, the first front wall and the second front wall each arranged in a plane formed by y, z directions and connected to one another with a first circumferential wall aligned in an axial x direction of the first fluid connection lines and the second fluid connection lines, the first circumferential wall formed with an expansion function for variable spacing of the first front wall and the second front wall in the axial x direction of the first fluid connection lines and the second fluid connection lines.

2. The sealing element according to claim 1, wherein the first fluid connection lines are formed as refrigerant connection lines of a refrigerant circuit and the second fluid connection lines are formed as coolant connection lines of a coolant circuit of an air-conditioning system.

3. The sealing element according to claim 1, wherein the first circumferential wall is formed to be closed around an entire circumference, and has an expansion wall element.

4. The sealing element according to claim 3, wherein the first circumferential wall is substantially formed as a hollow cylinder.

5. The sealing element according to claim 3, wherein the expansion wall element is connected to the first front wall on a first frontally formed edge in the axial x direction and to the second front wall on a second frontally formed edge distally to the first frontally formed edge.

6. The sealing element according to claim 3, wherein, in an unextended state of the sealing element, the expansion wall element has at least one reversal of direction of the wall in the range from 90° to 180°.

7. The sealing element according to claim 6, wherein, in the unextended state of the sealing element the expansion wall element has the reversal of direction of the wall at at least one front face and/or in a region between the front faces.

8. The sealing element according to claim 3, wherein the first circumferential wall has at least one section connected to the expansion wall element on a first frontally formed edge in the axial x direction, and connected to one of the first front wall and the second front wall around the entire circumference on a second frontally formed edge distally to the first frontally formed edge.

9. The sealing element according to claim 8, wherein the frontally formed edge of the at least one section of the first circumferential wall or of the expansion wall element is formed to surround the first front wall around the entire circumference on an outer circumference.

10. The sealing element according to claim 8, wherein the expansion wall element is connected around the entire circumference to the at least one section of the first circumferential wall on the first frontally formed edge in the axial x direction, and to one of the first front wall and the second front wall or to a section of the first circumferential wall different from the first section connected to the first frontally formed edge on the second frontally formed edge distally to the first frontally formed edge.

11. The sealing element according to claim 10, wherein, in an unextended state of the sealing element, a first one of the at least one section and a second one of the at least one section of the first circumferential wall are arranged inserted into one another.

12. The sealing element according to claim 3, wherein the first insertion openings are each formed to be surrounded by a first sealing region around the entire circumference, the first sealing region having a shape of an angled annular disk which is connected around the entire circumference to a perimeter of the first insertion opening at an inner radius and to the first front wall at an outer radius.

13. The sealing element according to claim 12, wherein the frontally formed edge of the at least one section of the first circumferential wall or of the expansion wall element is connected to the second front wall.

14. The sealing element according to claim 13, characterized in that the frontally formed edge of the at least one section of the first circumferential wall or of the expansion wall element is formed to surround an opening formed in the second front wall around the entire circumference on an outer circumference of the opening.

15. The sealing element according to claim 12, wherein the second insertion openings are each formed so as to be surrounded by a second sealing region around the entire circumference, the second sealing region having a shape of an angled annular disk which is connected around the entire circumference to a perimeter of the second insertion openings at an inner radius and to the second front wall at an outer radius.

16. The sealing element according to claim 15, wherein the second front wall is connected to a second circumferential wall, which is arranged aligned in the axial x direction, at an outer edge aligned distally to an inner edge formed as connection to the at least one section of the first circumferential wall or of the expansion wall element.

17. The sealing element according to claim 16, wherein the frontally formed edge of the second circumferential wall is formed to surround the second front wall at an outer circumference around the entire circumference.

18. The sealing element according to claim 16, wherein the second circumferential wall, at the outer edge aligned distally to the frontally formed edge as connection to the second front wall, has a third sealing region surrounding an edge around the entire circumference.

19. The sealing element according to claim 18, wherein the third sealing region is arranged substantially in a plane created by the y, z directions and is formed to point outwards from the frontally formed edge of the second circumferential wall.

20. A sealing arrangement, having
a refrigerant heat exchanger unit with a refrigerant heat exchanger and refrigerant connection lines,
a coolant heat exchanger unit with a coolant heat exchanger and coolant connection lines, and
the sealing element for sealing the refrigerant connection lines and the refrigerant connection lines in the feed-through opening of the wall according to claim 1.

21. A method of mounting the sealing assembly according to claim 20, having steps of:
pre-mounting the sealing element on the refrigerant connection lines of the refrigerant heat exchanger unit, the refrigerant connecting lines being inserted through the first insertion openings of the sealing element and the sealing element sealingly abutting the refrigerant connection lines,
arranging the refrigerant heat exchanger unit with the sealing element in an extended state in a housing of an air conditioning system,
arranging the coolant heat exchanger unit by pushing the coolant heat exchanger into the housing of the air conditioning system, wherein the coolant connection lines are arranged with a coolant circuit interface in a region of the second insertion openings of the sealing element,
mounting a sealing element housing on the housing of the air conditioning system, and
bringing the sealing element into an unextended state by folding in the sealing element, wherein the coolant connection lines with the coolant circuit interface are inserted through the second insertion openings of the sealing element.

* * * * *